(12) United States Patent
Aiello et al.

(10) Patent No.: US 6,301,130 B1
(45) Date of Patent: Oct. 9, 2001

(54) MODULAR MULTI-LEVEL ADJUSTABLE SUPPLY WITH PARALLEL CONNECTED ACTIVE INPUTS

(75) Inventors: Marc F. Aiello, Oakmont; Peter W. Hammond, Greensburg; Mukul Rastogi, Monroeville, all of PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 09/637,368

(22) Filed: Aug. 15, 2000

Related U.S. Application Data
(60) Provisional application No. 60/184,027, filed on Feb. 22, 2000, and provisional application No. 60/151,915, filed on Sep. 1, 1999.

(51) Int. Cl.[7] .................................................. H02M 5/458
(52) U.S. Cl. ............................... 363/37; 363/39; 363/65
(58) Field of Search ................................. 363/34, 37, 39, 363/40, 44, 47, 48, 65, 67, 68, 69, 70, 71

(56) References Cited

U.S. PATENT DOCUMENTS

| | | | |
|---|---|---|---|
| 4,788,635 | * 11/1988 | Heinrich | 363/37 |
| 5,214,366 | * 5/1993 | Hollman | 363/71 |
| 5,625,545 | 4/1997 | Hammond . | |
| 5,933,339 | * 8/1999 | Duba et al. | 363/71 |
| 5,986,909 | 11/1999 | Hammond et al. . | |
| 6,014,323 | * 1/2000 | Aiello et al. | 363/71 |
| 6,166,513 | * 12/2000 | Hammond | 318/764 |

* cited by examiner

Primary Examiner—Jeffrey Sterrett
(74) Attorney, Agent, or Firm—Buchanan Ingersoll (57) ABSTRACT

An improvement in a power drive is disclosed that allows four quadrant operation with reduced harmonics. The power drive has a multiphase, non phase shifted transformer with a single common input connected inductive reactance. Multiple series connected power cells are utilized, each configured for four quadrant operation and having a multiphase input and a single phase output, each controllable to reduce harmonics in both the input source line and the output line. Each power cell includes a three phase input converter, a smoothing filter, and a single phase output converter. A method for operating the power drive includes the steps of selectively controlling switching events at the input and output of each power cell such that switching events in respective power cells are spaced apart in time thereby reducing harmonic components. The method can be implemented using pulse width modulation control based upon interdigitated carrier signals which control the input and output of each power cell.

23 Claims, 6 Drawing Sheets

FIG. 4 A possible U, V, or W imput pole function with its fundamental component for nominal input FIG. 5 A possible U, V, or W imput pole function with its fundamental component for 80% nominal input

FIG. 6

Input current without Filter (THDi <10%)

MODULAR MULTI-LEVEL ADJUSTABLE SUPPLY WITH PARALLEL CONNECTED ACTIVE INPUTS

RELATED APPLICATIONS

This application claims the benefit of U.S. Provisional Application No. 60/151,915, filed Sep. 1, 1999 and 60/184,027, filed Feb. 22, 2000, both having the title "FOUR QUADRANT REDUCED HARMONICS POWER DRIVE AND METHOD."

FIELD OF THE INVENTION

The invention relates generally to a drive and method for operating a variable speed motor drive, and more particularly to medium voltage motor drives employing pulse-width modulation (PWM) control methods.

BACKGROUND OF THE INVENTION

Variable frequency drives traditionally are used in industry to provide variable electric speed to AC motors. These same drives can be used in other applications not related specifically to motors but where a variable-output voltage or frequency is desired. Typical drives have an AC input power source and some type of conversion apparatus, usually using solid-state devices, for converting the fixed AC input voltage into a variable-voltage and/or variable-frequency output. One such type of drive is disclosed in U.S. Pat. No. 5,625,545 to Hammond, which is incorporated herein by reference. The Hammond patent describes a power drive which utilizes a number of series connected power cells arranged and manipulated to produce a three-phase AC output. Connecting multiple power cells in series provides higher voltage output than would be available using only a single cell. Serial connection of cells allows multiple voltage states per phase which are used to obtain improved waveforms. Multiple power cells are provided in each phase output line to a three-phase AC motor. Three-phase AC input power is supplied to each power cell by way of a transformer, which contains multiple three-phase secondary winding circuits, each of which is connected to supply one corresponding power cell with three-phase AC input power. Each power cell controls the power that it supplies to the load using a PWM control method. To reduce harmonics in the source currents, the phase-angle of the secondary winding circuits is shifted, either by zig-zag or extended delta windings, in the Hammond patent.

Each power cell contains an input AC-to-DC rectifier, a smoothing filter, an output DC-to-AC converter, and a control circuit. The input converter accepts three-phase AC input from a secondary winding circuit of the power transformer. The input rectifier, rectifying diodes, transforms three-phase AC power into DC power with significant ripple. To ameliorate the effects of such ripple, a smoothing filter comprised of electrolytic capacitors is connected to the DC side of the input rectifier. The smoothing filter is also connected to the output converter. The output converter is a single-phase H-bridge semiconductor switch utilizing power transistors such as IGBTs. Each transistor of the output converter is operated by a local modulation control circuit. Power for the local modulator control circuit may be obtained within the power cell from the AC power supply.

The Hammond patent also discloses a method of controlling the output of such multiple power cells using a pulse-width modulation technique which selectively controls the duration and frequency of power cell pulse outputs. This method uses control signals, based upon interdigitated carrier signals, to selectively cause a switching event in the output converter of each power cell. The switching events are sequenced such that a switching event is occurring in only one power cell at a time.

One drawback of the power drive described in the Hammond patent is that it provides to only two quadrant operation. However, such medium voltage AC drives are inherently capable of operating in all four quadrants of the speed-torque plane. The first quadrant is where both speed and torque are positive and the third quadrant is where both speed and torque are negative. Thus, in the first and third quadrants, the product of torque and speed is positive. When the product of the torque speed is positive, power flow goes into the mechanical load of the motor. In contrast, second and fourth quadrants are those where the product torque speed is negative, i.e., when the motor is acting as a generator and power is flowing from the mechanical load through the motor and back to the inverter side of the drive. Conventional power drives utilizing multiple power cells, such as the drive disclosed in the Hammond patent, are not presently capable of operating in four quadrants.

It is known in the prior art to use a low voltage drive having a single power cell capable of operating in four-quadrants for providing power regeneration. One example of a four quadrant power cell is disclosed in U.S. Pat. No. 4,788,635 to Heinrich. Heinrich discloses that this is accomplished by controlling the voltage-source inverter on an AC input side to reverse the DC-link polarity thereof, while switching across the DC-link terminal connection to the inverter side thereof, so as to match the polarities. It is disclosed that this is accomplished by the implementation of such matching of polarities with cross-coupled GTO devices associated with the two diodes coupled with the respective poles of a DC-link capacitor between the output of the rectifier thyristor bridge and the DC-link terminal of the voltage-source inverter motor drive. The GTO devices are interrupted with a duty cycle selected in response to the voltage difference between the inverter DC input voltage and a constant reference voltage.

Nevertheless, single power cell configurations as described in Heinrich for providing four quadrant operation can have significant disadvantages due to undesirable harmonics, which are created even at no load situations.

Four quadrant operation can be very desirable in medium voltage AC drive applications because the regenerated power can be used to offset the cost of electricity which must be purchased from utility companies. For some users of such medium voltage, multiple power cell AC drives, energy requirements can be significant, and even a 5–10% power savings, due to the regenerative capability of the drive, can be a significant cost savings. Consequently, it is desirable to provide four quadrant operation for such power drives, without the disadvantage of the undesirable harmonics inherent in the single power cell drives.

SUMMARY OF THE INVENTION

This invention discloses an improvement to the previously disclosed power cell described in the Hammond patent. The improvement comprises a change in the topology and operation of the transformer, the AC to-DC input converter and the smoothing filter. The output converter of the power cell is essentially the same as that disclosed in the Hammond patent.

The present invention provides for a power drive utilizing multiple improved power cells to provide four quadrant operation and reduced harmonics in the input source line, and a method for operating such a drive. The drive can employ multiple improved power cells in each phase output line to a three-phase load, for example, a three phase AC motor. The improved power cells on any given phase output line can be connected serially, as taught in the Hammond patent.

Three phase AC input power can be supplied to each cell by way of a transformer, which preferably contains multiple secondary winding circuits, each of which can be connected to supply one corresponding power cell with three phase AC power. Preferably, each of the transformer secondary winding circuits have the same phase relationship with respect to each other. Consequently, because the secondary winding circuits of the transformer all have the same phase relationship, a single three-phase input reactor (filter) at the input of the multi-winding transformer primary can be used in lieu of the individual input reactors for each power cell. This can result in savings in the size of the system, transformer efficiency, leakage and the cost of the system, because the transformer can be designed with low leakage impedance which is generally desired by rectifier transformer manufacturers.

Each improved power cell preferably includes an input converter, which can be comprised of power transistors such as IGBTs, a smoothing filter, which can be comprised of filter capacitors, and an output converter, which can be comprised of IGBTs similarly to the input converter, except single phase. The input converter can control the three phase AC power input and regenerated power using a pulse width modulation control scheme which is optimized to reduce low order harmonics. The output converter can control the power supplied to the load, or regenerated from such load, using the same type of PWM control scheme as taught in the Hammond patent.

A reduction in source line harmonics is achieved in the present invention by precise control of the switching of the IGBTs of the input converter, such as by interdigitating switching events, to reduce harmonics in the output to the load. This can be accomplished by using a pulse width modulation control scheme based upon interdigitated carrier signals which control each input and output converter.

The input converter utilizes three pairs of IGBTs, one pair for each phase of the three phase AC input power. Each pair (pole) of IGBTs in both the input converter can be controlled by a binary switch function. In the input converter, the three switch functions are preferably identical for all corresponding poles in all power cells according to this invention. Each of the three poles in each cell is however modulated with reference signals that are 120 degrees phase shifted to each other in order to match the 3 phase input power to each cell which is well known in the prior art. According to the preferred control scheme, the same set of three binary functions can be used to control the input converter of each improved power cell.

An advantageous by-product of the improved power cells is that the input converter IGBTs enables full four-quadrant operation. The IGBTs, unlike the rectifying diodes of the prior art power cell, can operate in both directions, thus permitting controlled regenerative capability.

A preferred embodiment of the power drive can include employing additional line reactors and resistor dampened capacitor filters on the input source line ahead of the transformer primary winding circuit. Another preferred embodiment can include utilizing a combined transformer/input reactor.

Further details, objects, and advantages of the invention will become apparent from the following detailed description and the accompanying drawings figures of certain embodiments thereof.

BRIEF DESCRIPTION OF THE DRAWINGS

FIG. 8a shows a preferred embodiment of a drive having the transformer primary and secondary winding circuits connected utilizing a combined transformer/input reactor.

FIG. 8b shows a preferred embodiment of a "yoke and plug" construction for such the combined transformer/input-reactor shown in FIG. 8a.

DETAILED DESCRIPTION OF THE INVENTION

Figure 1:
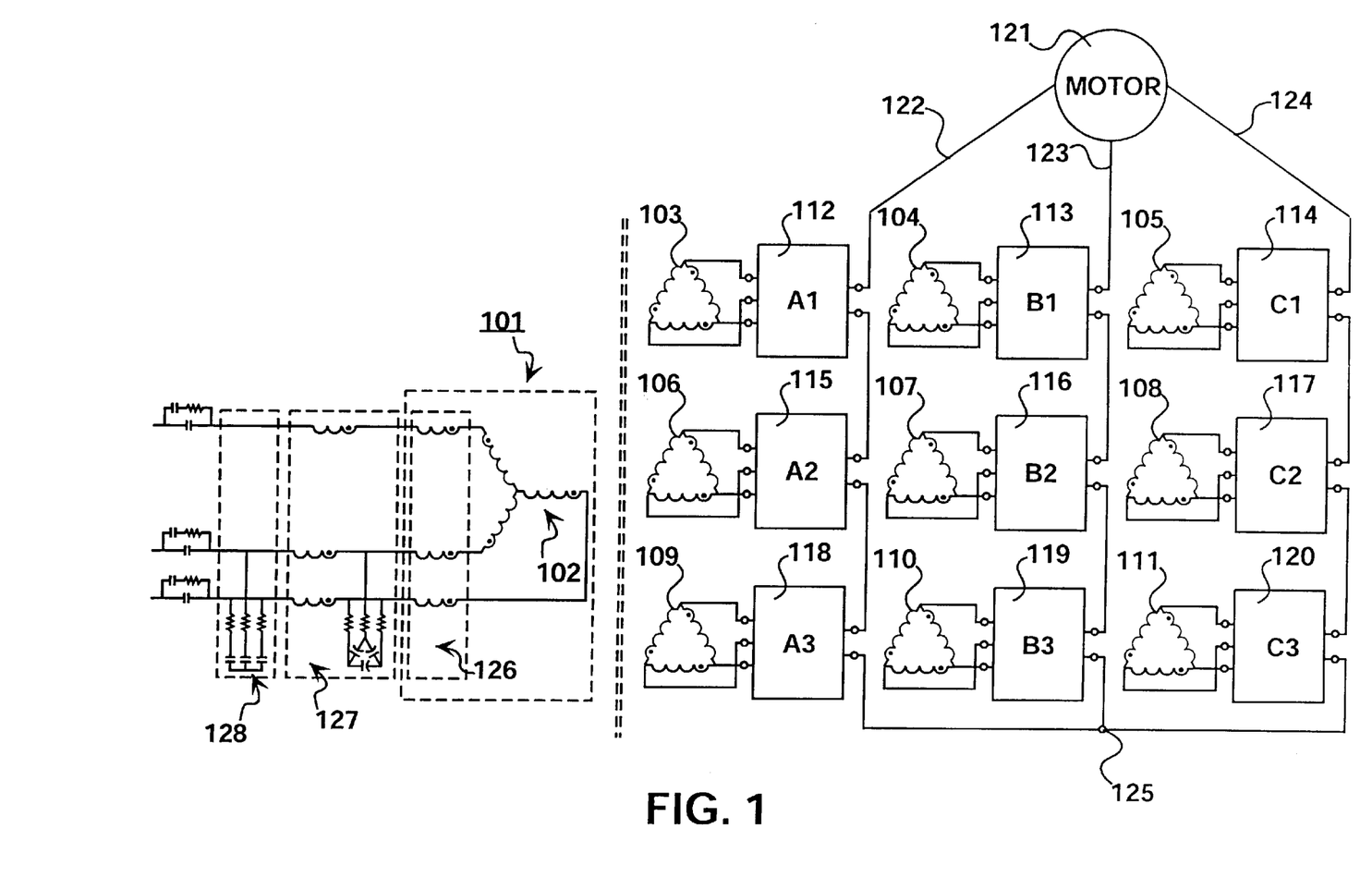
FIG. 1 is a diagram showing a preferred embodiment of a power drive according to the invention.

A power drive of the present preferred invention is shown in FIG. 1, having a unique, simple front end allowing full four quadrant operation. Three-phase AC input power is supplied to primary winding circuit 102 of power supply transformer 101. However, unlike power drives of the prior art, primary winding circuit 102 energizes multiple secondary winding circuits 103 through 111, which can generally be in phase with other secondaries in a respective leg. The three-phase power associated with each of secondary winding circuits 103–111 can be supplied to power cells 112 through 120, respectively.

Although a WYE primary winding 102 with delta secondary windings 103–111 is shown, a delta primary winding with WYE secondary windings can also be used. In fact, any arbitrary phase shift between the primary winding 102 and all secondary windings 103–111 is acceptable. However, it is presently preferred, for reasons of simplicity of control, smallest size, lowest cost and highest efficiency, that the secondary windings 103–111 be identical.

Three phase input reactor 126 is provided just ahead of the WYE primary 102. A unique feature of this topology is the use of the single input filter reactor 126 at the input of the multi-winding transformer 101 instead of individual three-phase reactors, which could be placed between the individual three phase secondary windings 103–111 and power cells 112–120 to accomplish the same purpose. The reactor 126 is a necessary component for all active input control since it is required to store energy during every switching event before that energy is released to the DC bus (in this case it is preferred to utilize individual DC buses in each cell). Eliminating the need for individual three phase reactors provides for both cost and size savings.

Figure 7:
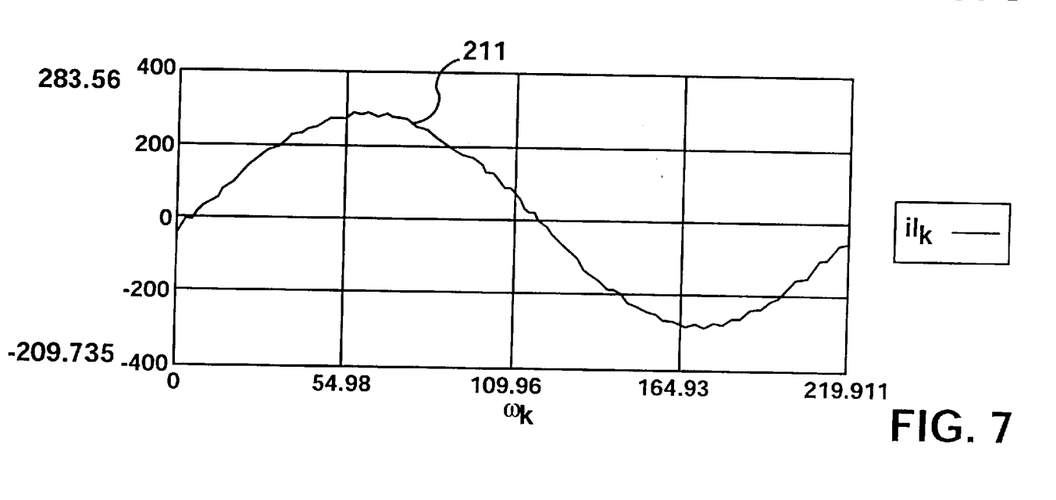
FIG. 7 is a graphical representation similar to FIG. 6 except showing simulated input current distortion when a preferred embodiment of an input filter is employed.

There is also shown an additional line reactor and resistor damped capacitor filter 127 which can be utilized in another presently preferred embodiment of the power drive 100. The additional line reactor and resistor damped capacitor filter 127 can further reduce input current distortion as shown in FIG. 7.

Another feature which can be required in some four quadrant drive applications is the ability to brake the motor and connected load in the event of input voltage loss. By allowing zero phase shift between individual secondary windings, a single three-phase set of dynamic brake resistors 128 can be added at the primary power input. The control of braking power to the dynamic brake resistors 128 is simplified if all the transistors in each of the power cells 112–120 are gated in tandem, because no phase shift exists between the secondary windings connected to power cells 112–120.

In other respects, the multiple power cells 112–120 can be connected to each of phase output lines 122, 123 and 124 in generally the same manner as in the prior art power drives. Likewise, such multiple power cells 112–120 can be connected in series on each phase output line to produce a medium voltage drive with a plurality of such low-voltage power cells 112–120. Each power cell may be constructed internally to low-voltage standards despite being part of a medium voltage drive. The individual power cells 112–120 can be isolated from ground and other power cells, using insulation suitable for the medium voltage level application.

As shown in FIG. 1, phase output line 122 is serially connected to the output of power cells 112, 115 and 118, phase output line 123 is serially connected to the output of power cells 113, 116 and 119, and phase output line 124 is serially connected to the output of power cells 114, 117 and 120. The power cells feeding branches 122, 123 & 124 can be joined in a WYE connection with a floating neutral 125. Thus configured, power cells 112–120 can impress a sufficient medium-voltage line-to-line voltage on motor 121, even though the individual power cells 112–120 are constructed internally of components rated to low-voltage standards.

The multiple secondary winding circuits 103–111 are not phase shifted with respect to each other to reduce source line harmonics. Instead, harmonics in the source line can be reduced by utilizing a power cell having the configuration shown in FIG. 2. As shown in FIG. 1, a single input reactor 126 is utilized, at the common input connection ahead of transformer primary winding circuit 102, which can be permissible due to the non-phase-shifted transformer secondary winding circuits 103–111. Consequently, additional individual input reactances for each of the power cells 112–120 are not required. However, if the transformer secondaries 103–111 were phase shifted, then individual reactances would have to be added, or "built in" leakage reactance would have to be relied upon to support the voltage differences at the input to the power cells 112–120.

Figure 2:
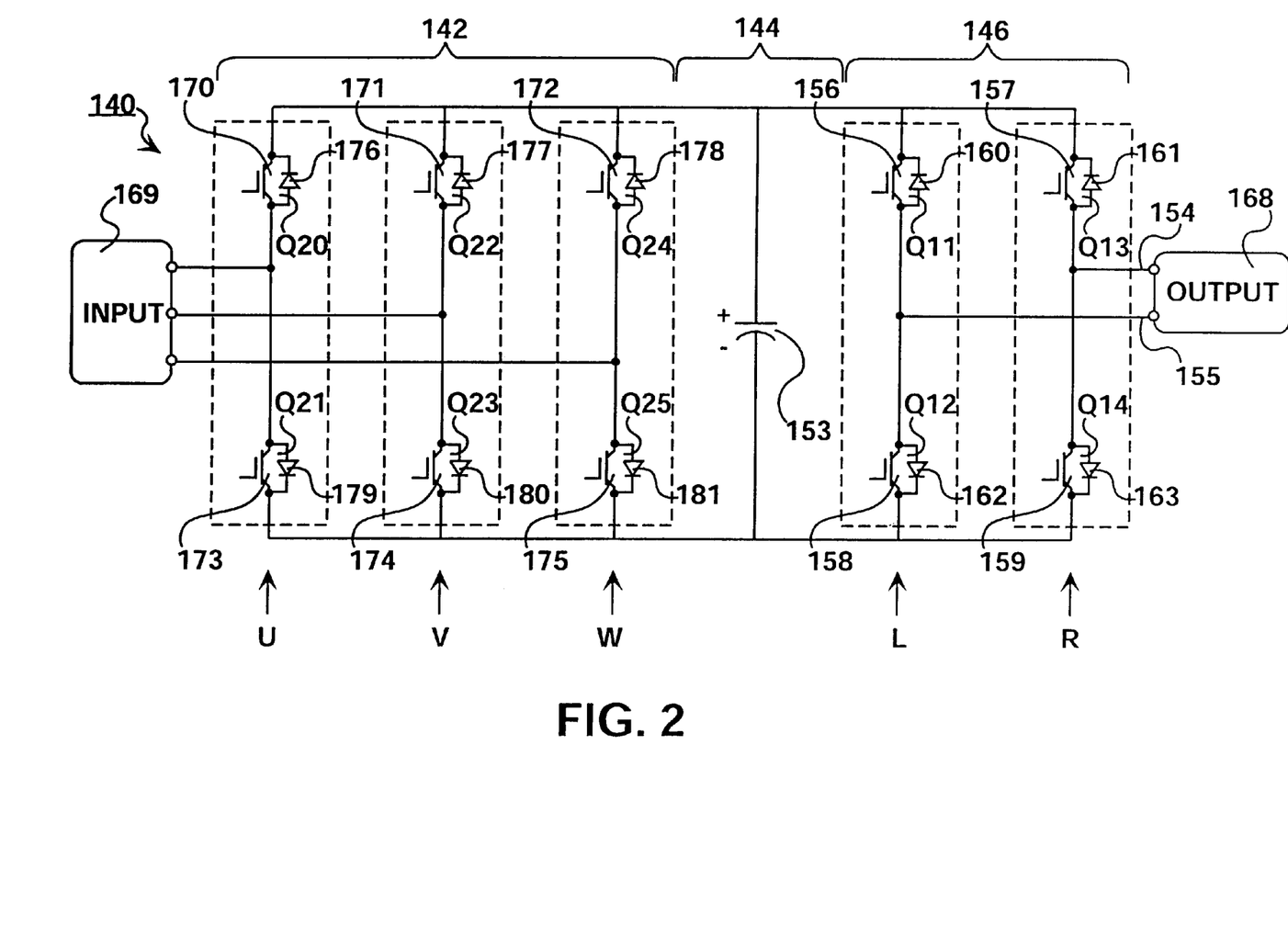
FIG. 2 is a diagram showing a preferred embodiment of an improved power cell according to the invention.

Referring to FIG. 2, a presently preferred embodiment of a power cell 140 is shown, which has three main portions: input converter 142, smoothing filter 144 and output converter 146. The smoothing filter 144 and output converter 146 can be generally identical to the corresponding portions of the prior art power cell shown in Hammond.

Figure 3:
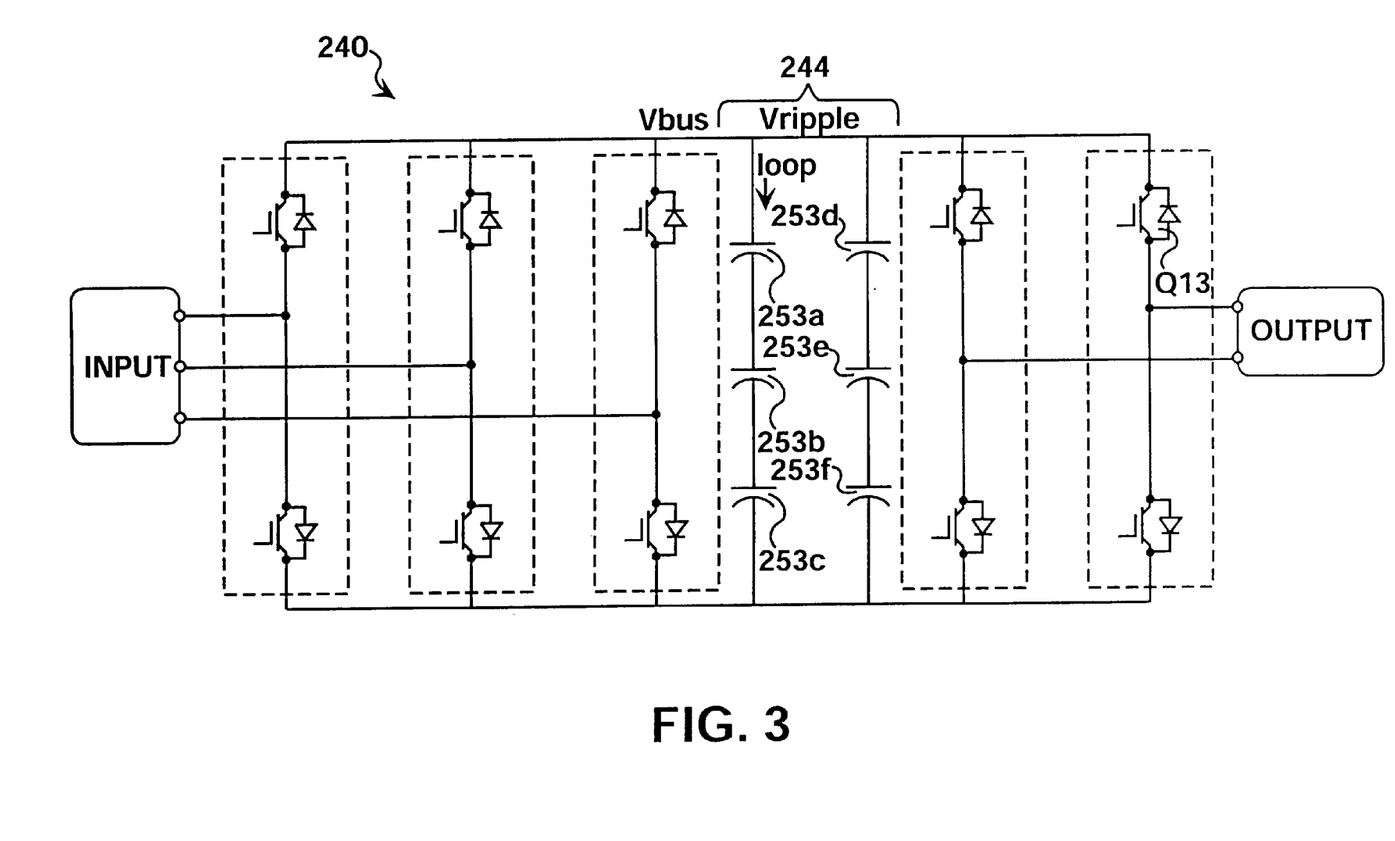
FIG. 3 is a diagram similar to FIG. 2 showing another preferred embodiment of an improved power cell having a bank of capacitors.

Input converter 142, however, is unique to improved power cell 140. Specifically, input converter 142, which will be described in detail below, can provide reduced harmonics in the input source line and also enable full four quadrant operation of the power drive. Improved power cell 140 can be similar to a prior art power cell with respect to structure and functioning of smoothing filter 144, shown as a capacitor 153, and output converter 146, which can be comprised of a single H-bridge of IGBTs 156–159. Additionally, as shown in FIG. 3, another embodiment of an improved power cell 240 can have a capacitor bank 244, comprised of multiple capacitors 253a–253f, instead of the single capacitor 153 in the power cell 140.

Input converter 142 can function, and be controlled by pulse width modulation, as with the output converter 146, except that the control is modified to account for some unique features of input converter 142. In particular, input converter 142 can have a three phase input. Consequently, the input converter can have three pole function switches, which are preferably identical. These differences are explained in more detail below.

In input converter 142, three pairs of IGBTs 170–175 are utilized to replace the three pairs of prior art rectifying diodes shown in the Hammond patent, to convert the three phase AC input power into a filtered DC power output. The input converter 142 IGBTs 170–175 can be activated by the dedicated three-phase AC secondary winding circuit 169 on the power transformer. One phase, line segment A, can be connected between IGBTs 170 and 173; another phase, line segment B, can be connected between IGBTs 171 and 174; and the third phase, line segment C, can be connected between IGBTs 172 and 175. Together, IGBTs 170–175 form a full four quadrant bridge converter, similar to the H-bridge output converter IGBTs 157–159, except having three input pole switch functions, shown as U, V and W. Each pair (pole) of IGBTs in both the input converter and the output converter is controlled by a binary switch function. Binary switch functions can be generated by many means, including the use of triangular PWM modulation techniques, which work well with interdigitated functions, which are generated by the comparison of a single reference against many phase shifted carriers. However, in the presently preferred input control scheme, wherein each power cell 140 can receive the same three switch functions, other schemes are better utilized to control the level of unwanted input harmonics.

During regeneration conditions, motor 121, which is fed via output 168 of multiple power cells 140, can regenerate through bridge diodes 160–162 of each power cell 140. In this way, energy regenerated by motor 121 is delivered to capacitor 153. The input inverter utilizing IGBTs 170–175 (Q20–Q25) is a bi-directional, full four quadrant bridge. The charge placed on capacitor 153 can be switched with IGBTs 170–175 (Q20–Q25) to feed power from the regenerating motor 121 back into the three phase line. The diodes 176–181 can act in a purely rectification mode during a motor operation where energy from the line is being delivered to motor 121. In a similar manner, except in reverse, IGBTs 170–175 are controlled through the use of appropriate firing circuitry to force power back into the AC line, thereby providing a regenerative circuit.

The input current quality of a four quadrant input converter 142 of the power cell 140, shown in FIG. 2, is optimized by selectively turning off the input transistor switch functions so that the input diodes 176–181 conduct when each function is turned off. When real power is transferred from the AC source to motor 121, diodes 176–181, at the input, conduct for a majority of the time, while transistors 156–159 (Q11–Q14), at the output, also conduct for the majority of the time. When real power is transferred from motor 121 to the AC source (regeneration), the role of the diodes and IGBTs is reversed, such that the input transistors 170–175 (Q20–Q25) conduct for a majority of the time and the output diodes 160–163 conduct for a majority of the time.

In the preferred embodiment, input pole functions U, V, and W are identical to each other, but phase shifted by 120 degrees with respect to each other. Also, it is preferred that these functions be identical to for all power cells 112–120, and that the respective functions cause the respective input poles for each of power cells 112–120 to switch in parallel with the corresponding poles for all other power cells. This allows for the lowest impedance transformer structure to be used, which may save cost, size and efficiency.

Figure 4:
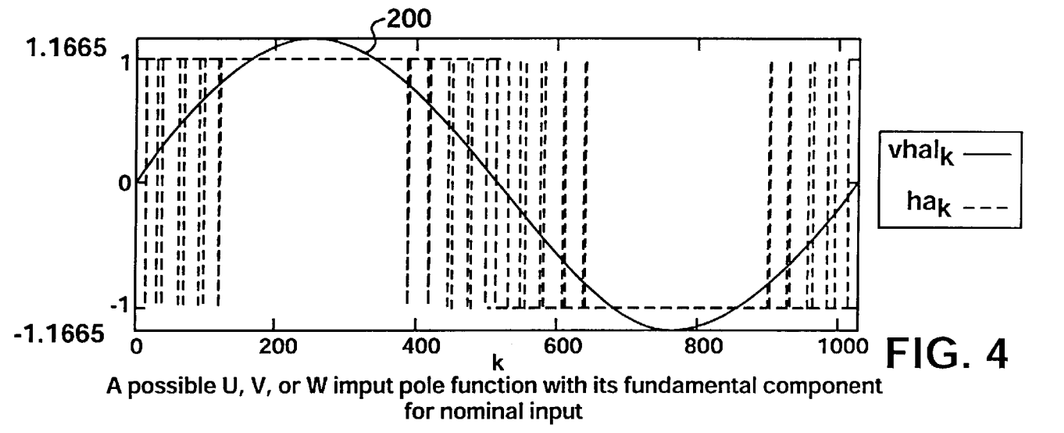
FIG. 4 is a graphical representation showing a pole function for a first input voltage condition to an input converter portion of the power cell shown in FIG. 2.
Figure 5:
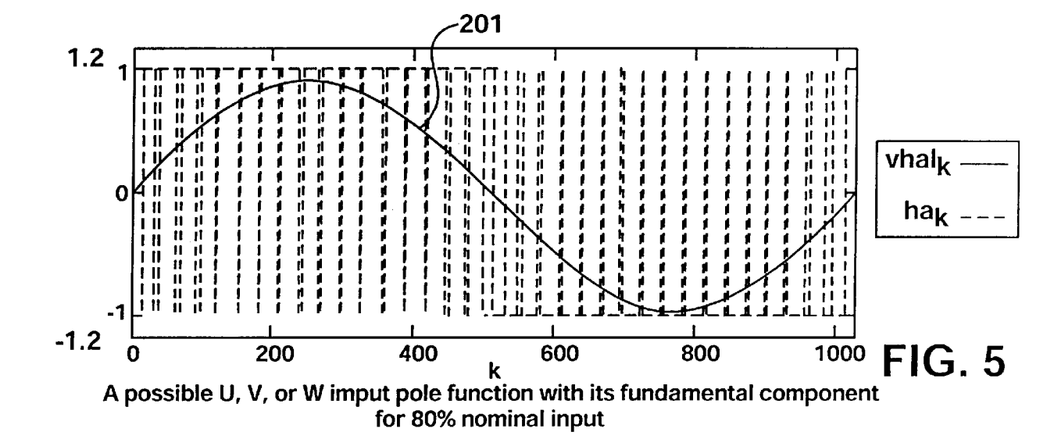
FIG. 5 is a graphical representation similar to FIG. 4 showing a pole function for a second input voltage condition.

FIGS. 4 and 5 depict the pole functions for two input voltage conditions, namely, nominal input line, represented by the waveform 200, and 20% low input line, represented by the waveform 201. One of the advantages of controlling both the phase shift and the modulation index of the pole functions U, V and W independently from one main master controller, which is monitoring the input conditions from the source, is that full rated voltage on the individual DC busses can be maintained over a very wide range of input line and source impedance conditions.

It is important that the functions depicted in FIGS. 4 and 5 be carefully generated in order to both maintain the required bus voltage and also minimize resulting input line current distortion. This can be done quickly in response to changing input line conditions by generating the U, V and W functions from a single common hub control system.

As indicated previously, the primary inductance 126 shown just ahead of the input to the multi-phase transformer 101 is required for active control. The choice of both the size of the reactor and the modulation functions shown in FIGS. 2 and 3 can determine the resulting input current distortion. Due to switching frequency limitations of the IGBTs, it is desirable to add the additional damped LC filter option 127 (the additional line reactors and resistor damped capacitor filters), as shown in FIG. 1, to further reduce the current distortion to below the IEEE THDi limit of 5%.

Figure 6:
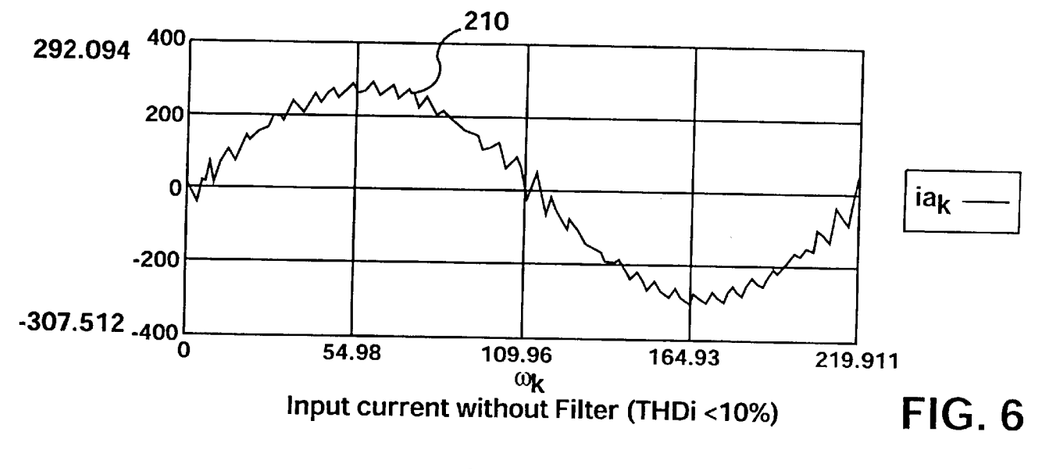
FIG. 6 is a graphical representation showing simulated input current distortion for the modulation function shown in FIG. 4.

FIGS. 6 and 7 show simulated input current distortion for the modulation function depicted in FIG. 4 (nominal line condition at rated output power). The spectra of the current waveform 210 shown in FIG. 6 is obtained without the optional input filter 127 and results in a total harmonic current distortion (THDi) that is less than 10%. The spectra of the current waveform 211 in FIG. 7 is with the optional input filter 127 and results in a current distortion that is well below the IEEE limit of 5%.

Currently in a typical prior art two quadrant power drive transformer, a minimum of 8% secondary impedance is required in order to insure low input current distortion. Some manufactures have indicated that for every 1% additional leakage reactance from the standard 5%, there results a 4% increase in transformer cost. Other manufactures have indicated that using new construction techniques could result in structures with less than 5% impedance and could also reduce cost. Therefore, the ability to allow the multi-winding transformer to posses low leakage reactance is important for not only for cost but also size and efficiency reasons. It should be noted that efficiency increases with lower leakage impedance. In the preferred embodiment, the leakage impedance should not exceed 4%. Additionally, to avoid having the circuit resonate, the capacitance 153 must be selected to match the leakage inductance such that the resonance frequency of the circuit is higher than the frequency of the output, preferably by a factor of 5 but at least by a factor of 2.

The functioning and control of input converter 142 of improved power cell 140 can be handled using the previously described pulse width modulation techniques, except for some differences in the particular applied method due to fact that there are three (input) pole functions, instead of a pair of (output) pole functions, as with the output converter. Moreover, such three pole functions are preferably identical to all power cells 140 (except shifted in phase to each other by 120 degrees), in contrast to the two output pole functions, which are unique.

Alternatively, a presently preferred method can comprise introducing a phase shift in the carriers used for each power cell 140. A variation of the topology shown in FIG. 1 is obtained by using a different method to generate the U, V and W switch functions for each power cell 140. If pulse-width modulation (PWM) is used to generate these switching functions by comparing three phase references to a triangular carrier waveform, then the harmonic content of the primary current can be reduced by introducing a phase shift in the carriers used for each power cell 140. Preferably, each power cell 140 can use the same carrier to generate the U, V and W switch functions, but the carrier used in a subsequent cell can be phase shifted by 360/N degrees of the carrier frequency, where N is the total number of cells. The benefit of such a modulation can be two-fold: reduction of harmonic content in the primary windings of the transformer and higher frequency harmonics as compared to the control described with no phase shift between power cells 140. This allows the size of the filter reactors to be smaller, making it easier and cheaper to filter the unwanted harmonics. However, this comes with a transformer that is higher in cost because the secondary leakage impedance is required to support the switching frequency volt-seconds.

Pulse width modulation of the input converter 140 can be effected using a bridge converter, similar to output converter 146 except having three legs, having semiconductor switches such as transistors 170 (Q20), 171(Q22), 172 (Q24), 173(Q21), 174(Q23) and 175 (Q25). Transistors 170–175 can be either fully ON or fully OFF as they operate, and may not significantly modulate pulse amplitude. Transistors 170–175 can be connected in a three phase bridge configuration, as shown. To form the bridge configuration, it is preferred to connect the emitter of transistor 170 (Q20) to the collector of transistor 173 (Q21). Similarly, the emitter of transistor 171 (Q22) can be connected to the collector of transistor 174 (Q23). Likewise, transistor 172 (Q24) can be connected to the collector of transistor 175 (Q24). Transistor pairs 170, 173, i.e., Q20 and Q21, 171, 174, i.e., Q22 and Q23, and 172, 175, i.e., Q24 and Q25 can each be connected to the capacitor 153 with the collectors of transistors 170 (Q20), 171 (Q22) and 172 (Q24) being connected to the positive side and the emitters of transistors 173 (Q21), 174 (Q23) and 175 (Q25) being connected to the negative side. Overvoltage protection of each of the transistors 170–175 can be accomplished by use of anti-parallel diodes 176–181. In such an arrangement, the cathode of diodes 176–181 is connected to the collector of transistors 170–175, respectively, and the anode of diodes 176–181 is connected to the emitters of transistors 170–175, respectively. Transistors 170–175 can preferably be power transistors, such as bipolar transistors or insulated gate bipolar transistors (IGBTs). Often such transistors include the anti-parallel diodes 176–181 in one package.

AC input power can be delivered through a first phase input line segment A by a connection between the emitter of transistor 170 (Q20) and the collector of transistor 173 (Q21). Likewise, power can be delivered through a second phase input line segment B by a connection between the emitter of transistor 171 (Q22) and the collector of transistor 174 (Q23). Similarly, power can be delivered through a third phase input line segment C by a connection between the emitter of transistor 172 (Q24) and the collector of transistor 175 (Q25).

The control of the input converter 140 can be accomplished in a manner similar to that for output converter 146. For example, transistors 170–175 can similarly receive control signals from the local modulation controller, through suitable isolation means, which can likewise be provided by a fiber-optic link. The modulation controller can select any of transistors 170 (Q20) or 173 (Q22) to be ON, any of transistors 171 (Q22) or 174 (Q23) to be ON, or any of transistors 172 (Q24) or 175 (Q25) to be ON, which will permit power to pass to the capacitor 153. A fiber-optic link can likewise be used to electrically isolate all circuits in any one power cell 140 from all circuits in any other power cells 140, and to reduce electromagnetic interference effects which may be imposed between a controller and a master modulation controller. The local modulation controller can similarly receive power from a local control power source.

Figures 8A, 8B:
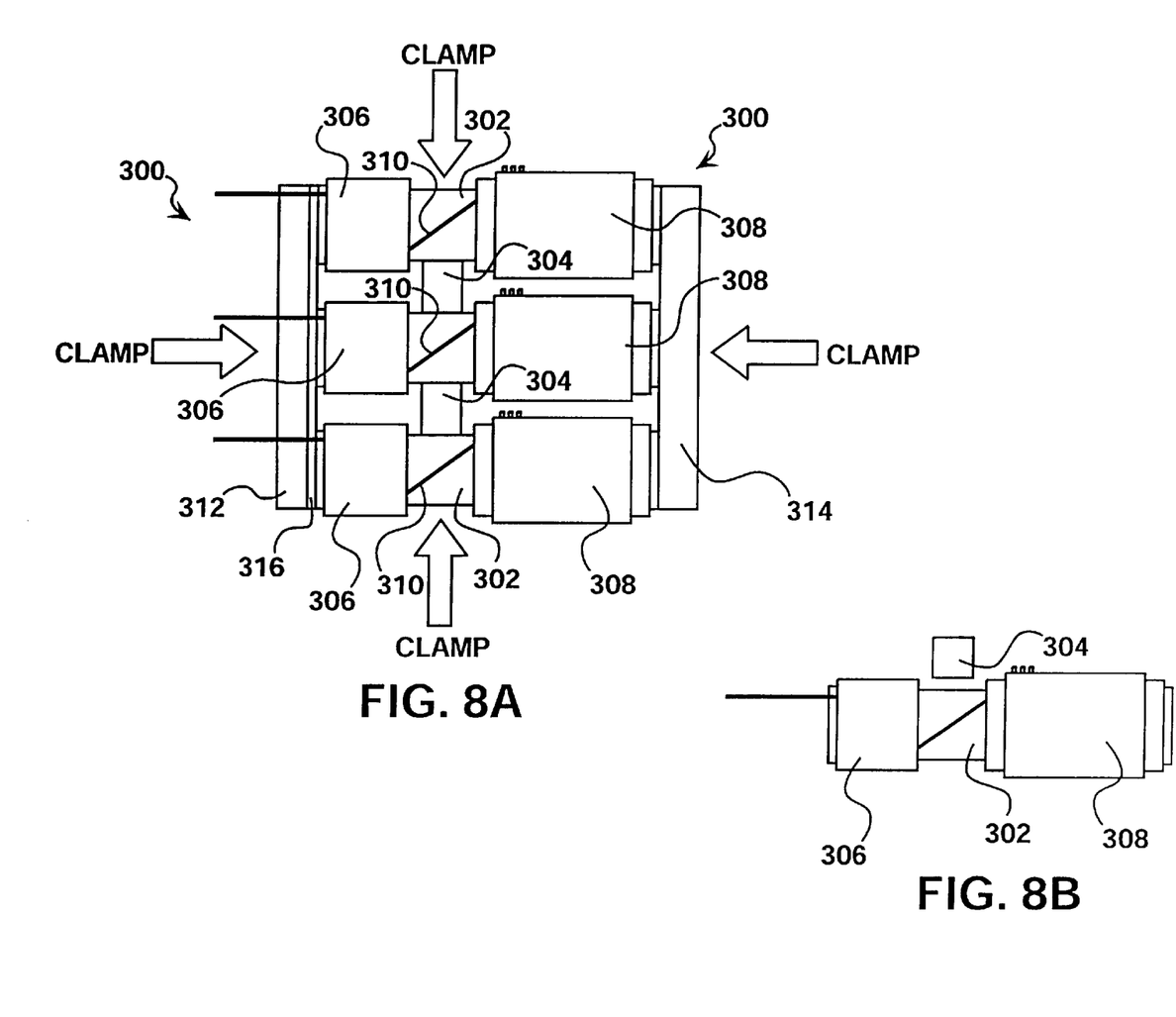

FIGS. 8a and 8b show a presently preferred embodiment of a combined reactor/transformer 300 that incorporates a "yoke" 302 and "plug" 304 construction technique, such as could be used in the preferred embodiment in which the individual reactors of each power cell have been combined into a single reactor at the three-phase input of transformer 101. It is well known that the energy storage capability of iron based inductors is primarily based on the volume size of the air gap which contains the highest quantity of B×H of the magnetic field enclosed by the circuit. Hence, magnetic circuit designers are compelled to maximize the area of the air gap in order to maximize the gap volume with the minimum air gap distance. Large air gaps result in excessive fringing and hence eddy current losses in both the copper and iron. A cost-effective design for an efficient multi-winding transformer (with low leakage impedance) also tends to maximize cross sectional area in order to reduce turns and therefore copper cost. It therefore makes sense to combine both these parameters to take advantage of a structure that could use common magnetic structures to save manufacturing cost.

As shown, such a combined reactor/transformer 300 can make use of the yoke 302 to combine both the input inductor primary windings 306 and the secondary windings 308 using a single winding 310. Plugs 304 and end caps 312 and 314 can then be used as usual to complete both magnetic circuits. Note that since the idea is to maximize cross-sectional area, a single gap 316 on the inductor side end cap 312 may provide for acceptable fringing. Note also that any fringing will not result in excessive copper loss since the gap 316 is not within the copper coil, but between the end cap 312 and the yoke 302.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention, which should be awarded the full breadth of the following claims and any and all embodiments thereof.

We claim:

1. A reduced harmonics power drive for a multi-phase AC load comprising:

a multi-phase power transformer having at least one primary winding circuit and a plurality of secondary winding circuits, said primary winding circuit electrically connectable to a multi-phase AC power source;

a plurality of power cells, each of said power cells comprising:
a controllable multi-phase input connected to a respective one of said plurality of secondary winding circuits;
a smoothing filter; and
a controllable single-phase output to said multi-phase AC load; and a modulation controller connected to each of said plurality of power cells, said modulation controller selectively controlling a series of switching events in said controllable multi-phase input such that one of said input phases of each of said power cells is switched simultaneously with corresponding input phases of all other power cells to reduce harmonics in input lines from said power source.

2. The power drive of claim 1 wherein said single phase output of a subset of said plurality of power cells are used in each phase output to said multi-phase AC load, said power cells in each of said subsets being connected serially.

3. The power drive of claim 1 wherein said modulation controller uses a common modulation signal to control said multi-phase input of each of said plurality of power cells.

4. The power drive of claim 1 wherein said switching events for any phase input of said controllable multi-phase input for each of said power cells is temporally separated from said switching events for all other phase inputs of said controllable multi-phase input for each of said power cells.

5. The power drive of claim 1 wherein said switching events for said controllable single phase output of each of said plurality of power cells in each phase output line are temporally spaced from each other, thereby reducing harmonic components in lines to said AC load.

6. The power drive of claim 5 wherein said controllable single phase output comprises a plurality of semiconductor switches arranged in an H-bridge configuration, said plurality of semiconductor switches being operably connected to said smoothing filter and said controllable multi-phase input, and each of said plurality of semiconductor switches being connected to said modulation controller.

7. The power drive of claim 1 wherein said a multi-phase power transformer further comprises:

a plurality of yoke members, one of which is provided between said primary and each of said plurality of secondary winding circuits;

at least one winding connecting said primary and said plurality of secondary winding circuits;

a plug member connecting said each of said plurality of yoke members;

a first end cap provided at a primary winding circuit side of said transformer and a second end cap provided at a secondary winding circuit side of said transformer to complete both magnetic circuits of said common magnetic structure; and an air gap between said first end cap and said plurality of yoke members.

8. The power drive of claim 1 wherein said plurality of secondary winding circuits have no phase shift with respect to each other, further comprising a multi-phase brake resistor combination connected to said primary winding to brake said load upon loss of input voltage.

9. The power drive of claim 1 wherein each of said input phases of said controllable multi-phase input includes a pair of IGBTs having an input function pole connected to said modulation controller, and further wherein said modulation controller modulates each of said poles using an identical modulation function to control said switching events.

10. The power drive of claim 1 wherein all of said secondary winding circuits are in phase with each other.

11. The power drive of claim 1 wherein each of said secondary winding circuits has the lowest possible secondary leakage reactance.

12. The power drive of claim 11 wherein said secondary leakage reactance of each of said secondary winding circuits is less than or equal to four percent.

13. The power drive of claim 1 wherein said smoothing filter is connected between said controllable multi-phase input and said controllable single phase output.

14. The power drive of claim 1 wherein said plurality of secondary winding circuits have no phase shift with respect to each other, further comprising a single multi-phase line reactor connected to said primary winding circuit for providing a common reactance to each of said controllable multi-phase inputs.

15. The power drive of claim 14 wherein said multi-phase line reactor is combined into a common magnetic structure with said primary winding circuit.

16. The power drive of claim 14 further comprising a multi-phase line reactor and resistor damped capacitor filter connected to said primary winding circuit to further reduce input current distortion.

17. The power drive of claim 1 wherein said smoothing filter comprises at least one capacitor.

18. The power drive of claim 1 wherein said smoothing filter has an impedance sufficiently large to a pulsating output current such as to force current cancellation between magnetically paralleled inputs of said power cells, thereby minimizing filter capacitor ripple current and voltage.

19. A reduced harmonics power drive for a multi-phase AC load comprising:
  a multi-phase power transformer having at least one primary winding circuit, and a plurality of secondary winding circuits, each of said secondary winding circuits having associated therewith a leakage reactance;
  a plurality of power cells, each of said power cells comprising:
    a controllable multi-phase input connected to a respective one of said plurality of secondary winding circuits;
    a smoothing filter; and
    a controllable single-phase output to said multi-phase AC load; and
  a modulation controller connected to each of said plurality of power cells; wherein said modulation controller selectively controls a series of switching events in said controllable multi-phase input and said controllable single phase output of each of said plurality of power cells to reduce harmonics in input lines from said power source and in output lines to said load; and
  wherein said smoothing filter of each of said power cells is matched to said leakage reactance of the secondary winding circuit connected to a respective power cell, such that the resonant frequency between said secondary leakage reactance and said capacitance of said smoothing filter is greater than the frequency of the output power.

20. The power drive of claim 19 wherein said resonant frequency is at least two times the frequency of the output power.

21. A reduced harmonics power drive for a multi-phase AC load comprising: a multi-phase power transformer comprising:
  at least one primary winding circuit said primary winding circuit electrically connectable to a multi-phase AC power source;
  a plurality of secondary winding circuits, said secondary winding circuits having no phase shift with respect to each other; and
  a single multi-phase line reactor connected to said primary winding circuit;
  a plurality of power cells, each of said power cells comprising:
    a controllable multi-phase input comprising a multi-phase input bridge connected to a respective one of said plurality of secondary winding circuits;
    a smoothing filter; and
    a controllable single phase output to said multi-phase AC load; and
  a modulation controller connected to each of said plurality of power cells;
wherein one of said input phases of each of said power cells is switched by said modulation controller simultaneously with corresponding input phases of all other power cells; and
wherein said single multi-phase line reactor provides a common reactance to each of said controllable multi-phase inputs of said plurality of power cells.

22. The power drive of claim 21 wherein each of said secondary winding circuits has a leakage reactance associated therewith and said smoothing filter of each of said power cells has a capacitance and further wherein the capacitance of said smoothing filter of each of said power cells is matched to said leakage reactance of the secondary winding circuit connected to a respective power cell, such that the resonant frequency between said secondary leakage reactance and said capacitance of said smoothing filter is greater than the frequency of the output power.

23. In a power drive having a multi-phase power transformer a plurality of power cells each having a plurality of phase input poles and a modulation controller connected to each of said plurality of power cells, a method for enabling four quadrant operation while reducing harmonics comprising the steps of:
  providing a common reactance, connected to a primary winding of said multi-phase power transformer, for each of said power cells;
  switching said input poles of said power cells in parallel with the corresponding input poles of all other power cells, but temporally spaced from other input poles in the same power cell;
  providing a plurality of secondary windings on said multi-phase power transformer, said secondary windings having a leakage reactance; and
  providing a capacitive element as a smoothing filter for each of said power cells and matching said capacitance of each of said smoothing filters with said leakage reactance of said secondary windings, such that the resonant frequency between said secondary leakage reactance and said capacitance of said smoothing filter is greater than the frequency of the output power.

* * * * *